United States Patent
Takatsu

[11] 3,883,125
[45] May 13, 1975

[54] TANDEM SUSPENSION
[75] Inventor: Yukihiro Takatsu, Yokohama, Japan
[73] Assignee: NHK Spring Co., Ltd., Yokohama, Japan
[22] Filed: Mar. 13, 1974
[21] Appl. No.: 450,610

[52] U.S. Cl. ............................. 267/38; 280/124 R
[51] Int. Cl. ............................................ B60g 11/08
[58] Field of Search .................. 267/38, 56, 48, 47; 280/124 R, 104.5

[56] References Cited
UNITED STATES PATENTS

| | | | |
|---|---|---|---|
| 1,758,411 | 5/1930 | Reid | 267/380 |
| 2,626,144 | 1/1953 | Stephen | 267/56 |
| 2,788,224 | 4/1957 | Ramun et al. | 280/124 R |

*Primary Examiner*—James B. Marbert
*Attorney, Agent, or Firm*—Flynn & Frishauf

[57] ABSTRACT

A tandem suspension is adapted to support two parallel axle shafts of a vehicle on the chassis of the vehicle and has a coupling mechanism which pivotally couples upper leaf spring means and lower leaf spring means rockably for relative pivotal movement therebetween about an axis extending through the middle portion of the upper and lower leaf spring means and parallel to the axle shafts, whereby the rocking or pivoting of the coupling mechanism enables the lower leaf spring means to function as a cushion to the axle shafts and as an equalizer beam.

5 Claims, 5 Drawing Figures

TANDEM SUSPENSION

BACKGROUND OF THE INVENTION

This invention relates to a tandem suspension used for supporting axle shafts of a heavy duty truck, an off-highway truck or the like.

The hitherto employed suspensions of this kind have usually such constructions as shown in FIGS. 1 and 2. In the FIG. 1 suspension, a laminated spring 3 is mounted on axle housings 1 and 2 and supported on the chassis 6 of a vehicle through a cross tube 4 and a base 5. In the FIG. 2 suspension, axle housings 1 and 2 are supported on the chassis 6 of a vehicle through a cross tube 4, a laminated spring 8 and an equalizer beam 9. Reference numeral 7 in both FIGS. 1 and 2 denotes wheels attached to axle shafts (not shown). The FIG. 1 suspension is defective in that the base 5, which should be secured to the chassis 6, is made inevitably strong and weighty, and the chassis 6 needs a reinforcement. Though the FIG. 2 suspension requires no base since the laminated spring 8 rests on the chassis 6 at its both ends, it is also disadvantageous in that it necessitates a strong and heavy equalizer beam. These defects inherent to the FIGS. 1 and 2 suspensions result in a weight increase of the vehicles and should therefore be eliminated.

SUMMARY OF THE INVENTION

Accordingly, the object of this invention is to provide a tandem suspension which is free of the above-noted disadvantages of the prior art suspensions and is light, yet fully absorbing shocks and vibrations. To achieve the object, the tandem suspension according to the present invention is made in the form of a spring assembly adapted to support two parallel axle shafts on the vehicle chassis and provided with a pair of parallel axle housings, upper leaf spring means, lower leaf spring means and a coupling mechanism which pivotally couples the upper and lower leaf spring means swingably about an axis extending through the middle portions of the upper and lower leaf spring means and parallel to the axle housings. The upper leaf spring means is mounted on the chassis at both of its ends, and the lower leaf spring means on the axle housings at the ends thereof. Coupled swingably to the upper leaf spring means by the coupling mechanism, the lower leaf spring means can perform the function of an equalizer beam in addition to its own spring action. The upper and lower leaf spring means may be laminated springs, or at least one of them may be a tapered leaf spring thick at the middle portion and thinning toward the ends. The coupling mechanism may be constituted by an upper coupling piece and a lower coupling piece fixed to the upper and lower leaf spring means respectively and jointed together by a pivot pin parallel to the axle housings. Instead of such coupling mechanism, any well-known coupling means can be employed in the present invention.

With such a construction, the tandem suspension according to the invention does not necessitate any massive and heavy base and any reinforcement to the chassis since the upper leaf spring means is mounted on the chassis at both ends thereof and does not require any weighty equalizer beam since the lower leaf spring means is pivotally coupled to the upper leaf spring means by the coupling mechanism, thereby performing the function of an equalizer beam in addition to its own spring action. The tandem suspension of this invention is believed to be a desirable one being light in weight and having a good shock absorbing function.

DESCRIPTION OF THE PREFERRED EMBODIMENTS

Figure 3:
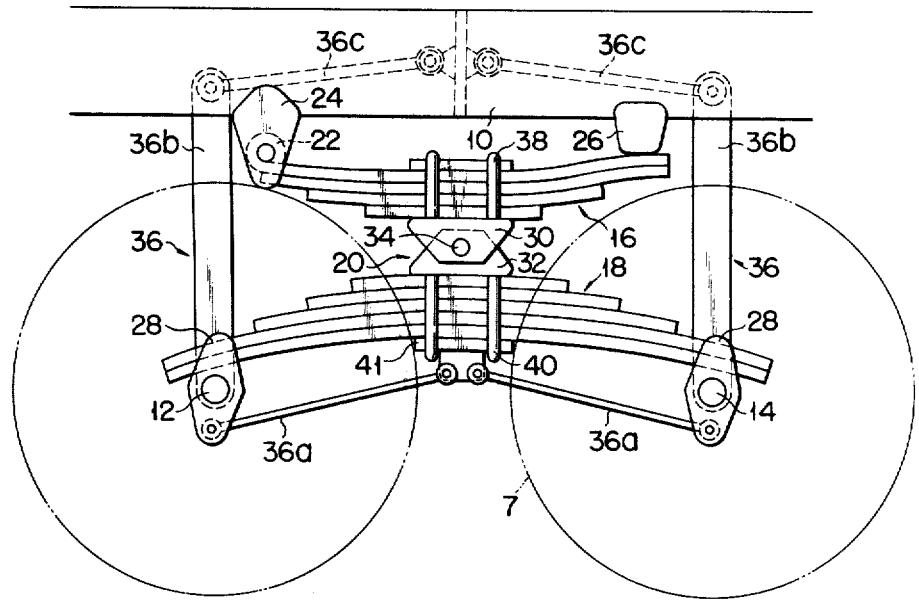
FIG. 3 shows an embodiment of this invention wherein upper leaf spring means and lower leaf spring means are coupled by a pin.

In the embodiment of FIG. 3, two parallel axle housings 12 and 14 are supported to the chassis 10 of a vehicle through an upper laminated spring 16, a coupling mechanism 20, a lower laminated spring 18 and a link mechanism 36. The laminated spring 16 has at one end an eye 22 engaged with a spring hanger 24 fixed to the chassis 10 and has the other end pressed onto a spring seat 26 secured on the chassis 10. The lower laminated spring 18 is mounted at the ends on the axle housings 12 and 14. The axle housings 12 and 14 are fitted into brackets 28, respectively. The brackets 28 are linked through linking rods 36a to a pad 41 fastened to the lower laminated spring 18 by U-bolts 40 and to the chassis 10 through linking brackets 36b and linking rods 36c. The brackets 28, the linking rods 36a, the linking brackets 36b and the linking rods 36c are assembled into a link mechanism 36.

The coupling mechanism 20 comprises an upper coupling piece 30 fixed by U-bolts 38 to the upper laminated spring 16, a lower coupling piece 32 fixed by the U-bolts 40 to the lower laminated spring 18 and a pivot pin 34 penetrating the superposed portions of the coupling pieces 30 and 32 parallel to the axle housings 12 and 14. The laminated springs 16 and 18 can rock or pivot about the pin 34 jointly with the coupling pieces 30 and 32 to some extent allowed by the link mechanism 36.

It shall now be explained why the suspension of this invention can be made lighter than the conventional ones.

Figure 1:
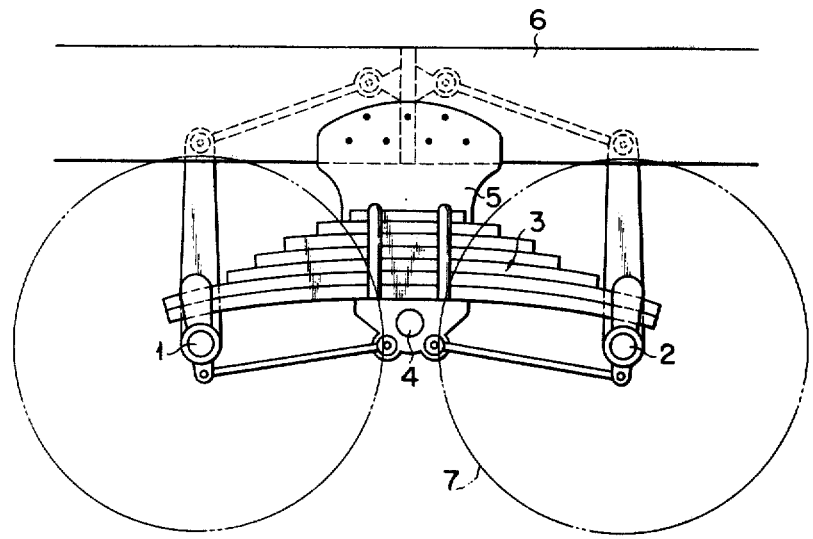
FIGS. 1 and 2 each show a conventional tandem suspension.
Figure 2:
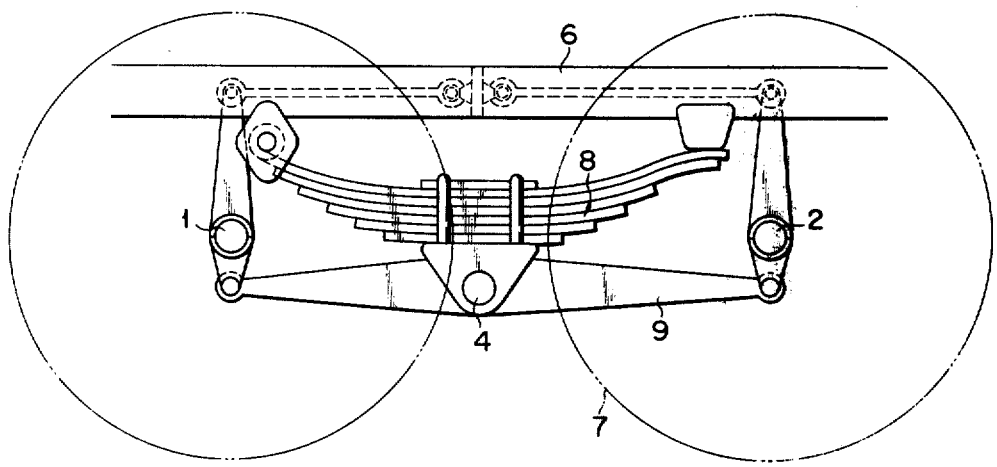

Let the spring constants of the laminated springs 16 and 18 be denoted respectively as $k_1$ and $k_2$, that of a combination of the springs 16 and 18 superposed one upon the other as $k_3$, and that of the laminated springs shown in FIGS. 1 and 2 as $k_0$. Then, the following equation is established:

$$\frac{1}{k_3} = \frac{1}{k_1} + \frac{1}{k_2} \qquad (1)$$

The weight W of a laminated spring is usually indicated as:

$$W = \frac{3EP^2\rho}{\sigma^2} \cdot \frac{1}{k} \qquad (2)$$

where $k$ : spring constant,
$E$ : modulus of longitudinal elasticity,
$P$ : applied load
$\rho$ : weight per unit volume
$\sigma$ : stress Let $3EP^2\rho/\sigma^2$ be assumed as "C." Equation (2) is then transformed to : $W = C \cdot 1/k$ Thus, the weights $W_1$, $W_2$, $W_0$ of the laminated springs having different spring constants $k_1$, $k_2$ and $k_0$, so long as C's of the springs are the same, can be indicated respectively as:

$$W_1 = C \frac{1}{k_1} \quad (3)$$

$$W_2 = C \frac{1}{k_2} \quad (4)$$

$$W_3 = C \frac{1}{k_0} \quad (5)$$

Based on equations (1) and (3) to (5), the total weight $W_3$ of the laminated springs 16 and 18 used in this invention is indicated as:

$$W_3 = W_1 + W_2 = C \left( \frac{1}{k_1} + \frac{1}{k_2} \right) = C \frac{1}{k_3} \quad (6)$$

Let us now compare equation (6) with equation (5). If $k_3$ equals $k_0$, $W_3$ is identical with $W_0$. Consequently, a combination of the laminated springs 16 and 18, if intended to possess the same spring constant as a laminated spring used in the FIGS. 1 and 2 conventional suspensions, should have the same weight as the spring employed in the prior art suspensions so long as C's of all the four springs are identical.

The suspension according to this invention can dispense with such a base 5, a reinforcement to the chassis and an equalizer beam 9 as shown in FIGS. 1 and 2 - all being heavy. The suspension can therefore be made lighter than the prior art suspension, yet having the same spring constant and performing the same function as the conventional suspension owing to the pivotal coupling mechanism 20.

Figure 4:
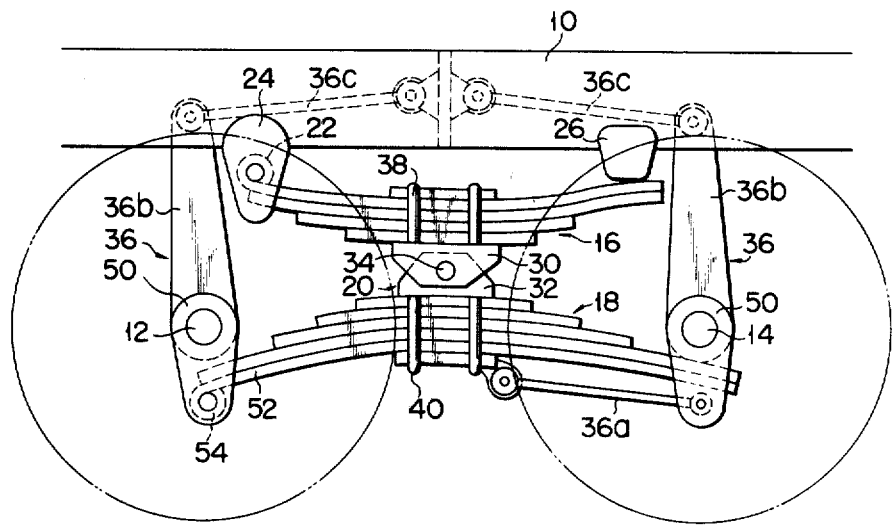
FIG. 4 shows a modification of the FIG. 3 embodiment.

In another embodiment of FIG. 4, a laminated spring 18 has a plain end and an eye 54 formed on its main leaf 52 and is mounted on brackets 50 journaled on axle housings 12 and 14 and only a single linking rod 36a links one of the brackets 50 to the pad of the laminated spring 18. This embodiment is identical in the other features with that shown in FIG. 3.

Figure 5:
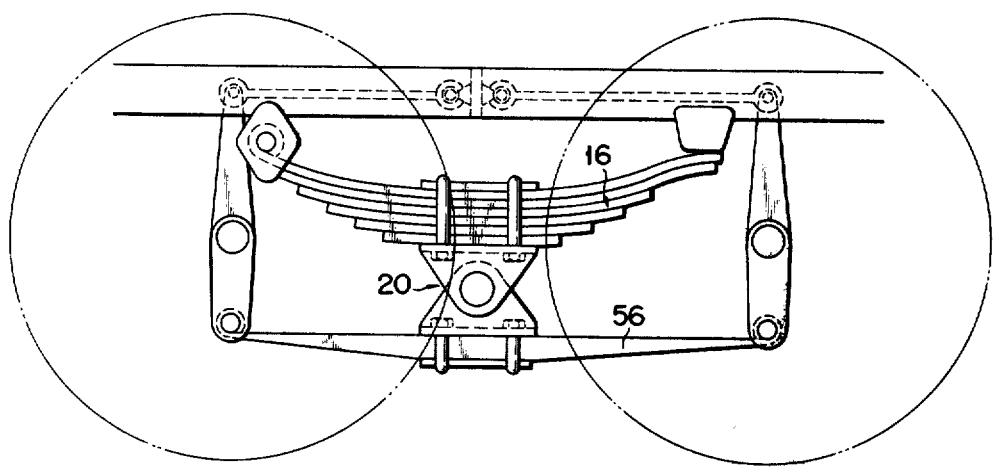
FIG. 5 is another embodiment of this invention, wherein an upper laminated spring is coupled with a tapered leaf spring.

Another embodiment as shown in FIG. 5 is provided with, for the lower leaf spring means, a tapered leaf spring 56. The tapered leaf spring 56 and an upper laminated spring 16 are rockably or pivotally coupled together by a coupling mechanism 20, thereby to perform the same function and result in the same effect as the FIGS. 3 and 4 embodiments. In other features, this embodiment is substantially identical with the FIGS. 3 and 4 embodiments.

What is claimed is:

1. A tandem suspension comprising:
   two parallel axle housings (12, 14),
   upper leaf spring means (16) mounted at both ends thereof on the chassis of a vehicle,
   lower leaf spring means (18) mounted at the respective ends thereof to said axle housing (12, 14), and
   a coupling mechanism (20) pivotally coupling said upper (16) and lower (18) leaf spring means together substantially at the middle portions of said upper and lower leaf spring means for relative pivotal movement between said upper and lower leaf spring means about an axis extending substantially parallel to said axle housings.

2. A tandem suspension according to claim 1, wherein said coupling mechanism includes an upper coupling piece (30) fixedly connected to said upper leaf spring means (16), a lower coupling piece (32) fixedly connected to said lower leaf spring means (18) and a coupling pin (34) for pivotally coupling said coupling pieces together.

3. A tandem suspension according to claim 1, wherein said upper and lower leaf spring means (16, 18) comprise laminated springs.

4. A tandem suspension according to claim 1, wherein at least one of said upper and lower leaf spring means (16, 18) comprises a tapered leaf spring.

5. A tandem suspension according to claim 1, further comprising a link mechanism (36) including linking brackets (36b) journaled on respective axle housings (12, 14) and links (36a, 36c) for linking said linking brackets (36b) to the chassis of a vehicle and to said upper and lower leaf spring means (16, 18).

* * * * *